Oct. 18, 1927.
A. H. NOBLE
1,646,358
LIP STICK HOLDER
Filed Nov. 4, 1926
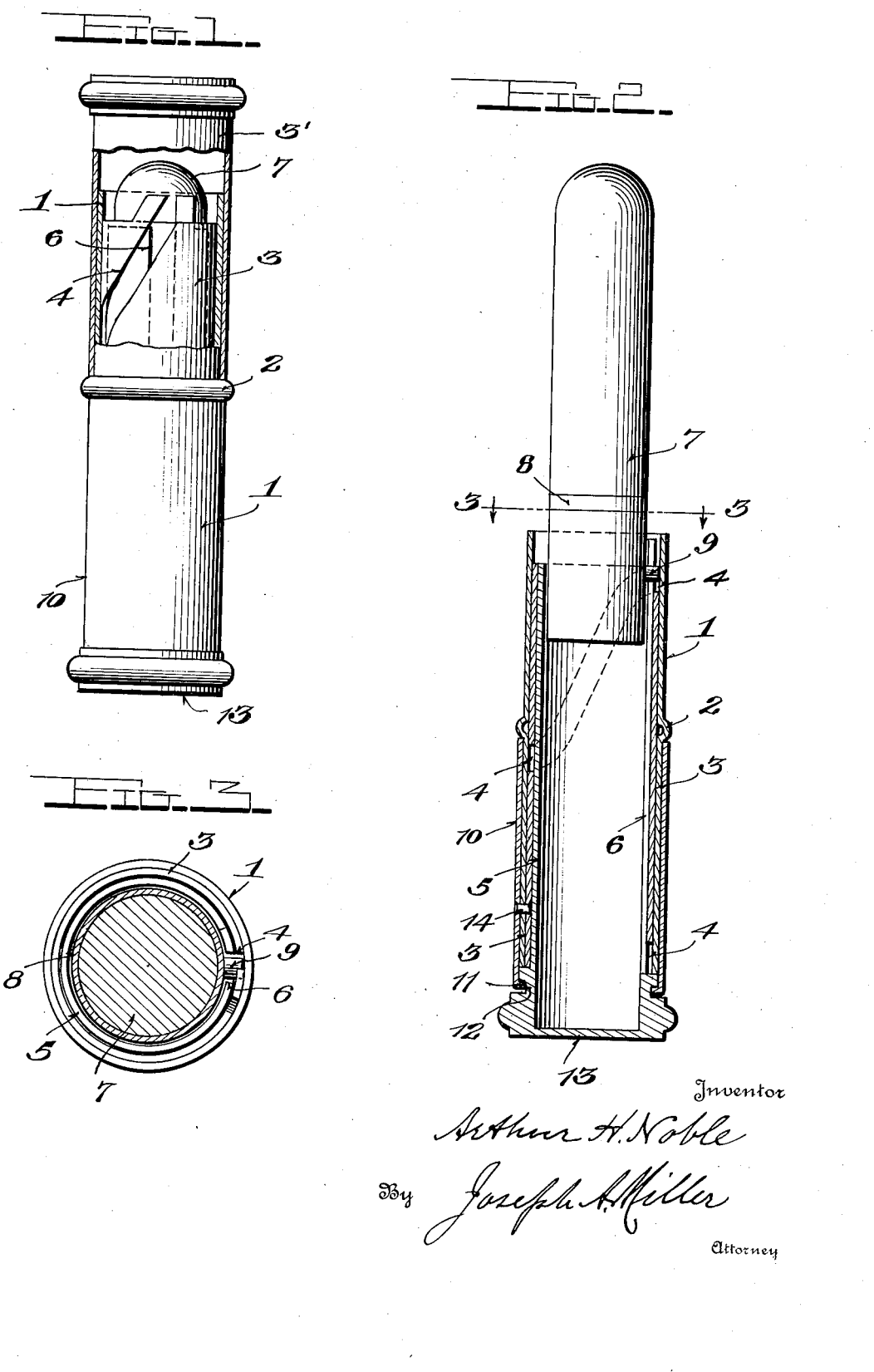
Inventor
Arthur H. Noble
By Joseph A. Miller
Attorney Patented Oct. 18, 1927.

1,646,358

UNITED STATES PATENT OFFICE.

ARTHUR H. NOBLE, OF PAWTUCKET, RHODE ISLAND, ASSIGNOR TO THEODORE W. FOSTER & BROTHER COMPANY, OF PROVIDENCE, RHODE ISLAND.

LIP-STICK HOLDER.

Application filed November 4, 1926. Serial No. 146,167.

This invention relates to certain new and useful improvements in lip stick holders, and the primary object thereof is to provide a holder having improved means which enable a worn lip stick to be easily and quickly removed and a fresh one applied and to also enable a very short holder to be employed.

A further object of the invention is to provide a holder which has novel means of simple, compact and economical construction for effecting easy, quick and positive movement of the lip stick into and out of the holder.

The invention has still further and other objects which will be later set forth and manifested in the course of the following description.

In the drawings:—

Fig. 1 is a side elevation partly broken away and in section of the invention with the parts in inoperative and housed position, and Fig. 2 is a longitudinal sectional view showing the parts in operative position, Fig. 3 is a section on line 3—3 of Fig. 2.

In proceeding in accordance with the present invention a tubular casing 1 is employed having a bead 2 intermediate its ends to form a stop for a protecting cap or closure 3. A sleeve is fixed interiorly of the casing 1 and is formed with a spiral slot 4. A sleeve 5 is mounted in the sleeve 3 and has an axial slot 6.

All of the three parts 1, 3 and 5 are open at their tops so as to permit a lip stick 7 to be inserted therein, the lip stick has a metallic ferrule 8 thereon which latter is provided with a pin or projection 9.

An outersleeve 10 is mounted over the casing 1 and has an inturned bottom edge 11, which latter engages in a peripheral slot 12 of a head 13 on the lower end of the sleeve 5, by which means the head is rotatably supported on the casing. A fastener, such as a rivet 14 secures the sleeve 10 and the sleeve 3 to the casing.

In operation, the lip stick is inserted in the casing and the head 13 rotated, whereupon, when the slots 4 and 6 register, as shown in Fig. 1, the pin 9 will enter the slots and the lip stick will be moved into and out of the casing upon rotation of head 13 in the desired direction. The pin, it will be noted, may enter the casing at any point throughout the circumference of the casing.

Having thus described my invention what I claim as new and desire to secure by Letters Patent is:—

1. In a lip stick holder, a lip stick having a ferrule thereon provided with a pin, a casing, a stationary sleeve in the casing having a spiral slot, a rotary sleeve in the first sleeve having an axial slot an outer sleeve surrounding the casing and having an inturned bottom edge, a head fixed on the lower end of the rotary sleeve and having a peripheral slot receiving said inturned edge, and means to fixedly secure the outer and stationary sleeves to the casing, the sleeves within the casing and the latter having their upper ends open to permit the lip stick to enter the top of the holder and the pin of its ferrule to enter the slots.

2. In a lip stick holder, a lip stick having a ferrule thereon provided with a pin, a casing, a stationary sleeve in the casing having an open ended spiral slot, a rotary sleeve in the first sleeve having an open ended axial slot, an outer sleeve surrounding the casing, a head on the lower end of the rotary sleeve, and means to rotatably connect the head to the outer sleeve, the two inner sleeves and the casing having their upper ends open to admit the lip stick and permit the pin of its ferrule to enter the slots.

3. In a lip stick holder, a casing, a sleeve having an open ended spiral slot fixed in the casing, a rotary sleeve in the fixed sleeve having an open ended axial slot, a head on the rotary sleeve extending over the casing bottom, means to connect the rotary sleeve to the casing to prevent longitudinal movement thereof, and a lip stick having a ferrule thereon provided with a pin, the upper ends of the inner sleeves and the casing being open to admit the lip stick and the pin of its ferrule.

4. In a lip stick holder, a casing open at its top, a rotary and a fixed sleeve in the casing each having an open top, one of the sleeves having an axial slot and the other a spiral slot, both of said slots extending through the said open tops of the respective sleeves and being capable of registry in one position of the sleeves, means to operate one of the sleeves, and a lip stick carrier having a laterally projecting pin receivable within the casing at any point throughout the circumference of the top of the casing and receivable in the top ends of the slots in registry of said top ends of the slots.

5. In a lip stick holder, a casing open at its top, lip stick operating means within the casing having an inlet at its top, and a lip stick carrier having a lateral projection receivable within the casing at any point throughout the circumference of the top of the casing and receivable in said inlet of the operating means.

6. In a lip stick holder, a sleeve, a head formed integral with the lower end of said sleeve and having a peripheral depression therein, said sleeve having an axially extending open ended slot, a sleeve surrounding said first sleeve and having an open ended spiral slot therein formed to cooperate with the axial slot of the first sleeve, a lip stick having a ferrule thereon provided with a laterally projecting pin extending through said slots, and a casing surrounding the sleeves and having an inturned lower end engageable in the peripheral depression of the head, whereby rotation of the head and first sleeve will eject the ferrule and lip stick from said casing.

7. In a lip stick holder, a sleeve, a head formed integral with the lower end of the sleeve and having a peripheral depression therein, said sleeve having an axially extending open ended slot, a second sleeve surrounding the first sleeve and having an open ended spiral slot therein formed to cooperate with the slot in the first sleeve, a lip stick having a ferrule thereon provided with a laterally projecting pin extending through said slots, and means carried by said second sleeve having rotatable connection with the depression in the head whereby to eject the lip stick from said holder upon rotation of the first sleeve and head.

In testimony whereof I have signed my name to this specification.

ARTHUR H. NOBLE.